Figure 3:
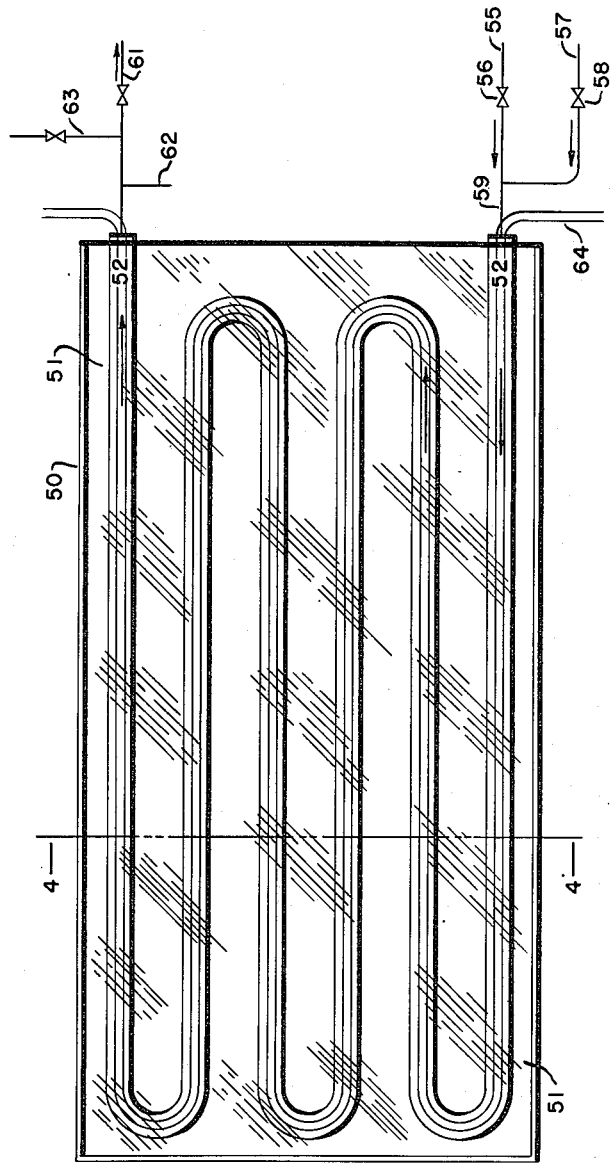

Oct. 20, 1953  L. A. MILLER ET AL  2,656,313
PHOTOCHEMICAL PRODUCTION OF BENZENE HEXACHLORIDE
Filed May 10, 1949  3 Sheets-Sheet 1
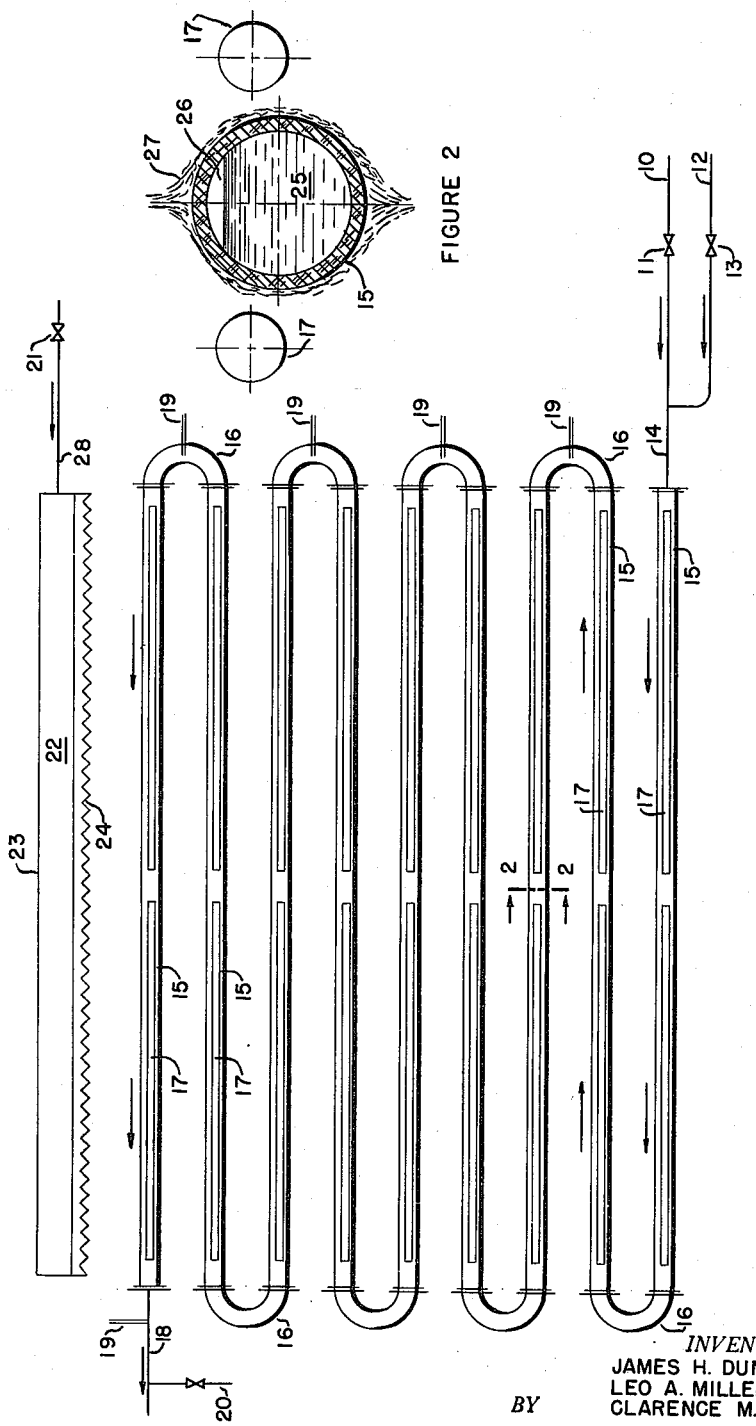
INVENTORS
JAMES H. DUNN
LEO A. MILLER
CLARENCE M. NEHER
BY Kenneth Swartwood Patented Oct. 20, 1953

2,656,313

UNITED STATES PATENT OFFICE 2,656,313

PHOTOCHEMICAL PRODUCTION OF BENZENE HEXACHLORIDE

Leo A. Miller, James H. Dunn, and Clarence M. Neher, Baton Rouge, La., assignors to Ethyl Corporation, New York, N. Y., a corporation of Delaware Application May 10, 1949, Serial No. 92,266

1 Claim. (Cl. 204—163)

This invention relates to the manufacture of chlorinated hydrocarbons and apparatus for the manufacture thereof. In particular, the invention is concerned with the manufacture of benzene hexachloride and a new and improved method of carrying out the formation reaction.

Benzene hexachloride, $C_6H_6Cl_6$, also called hexachlorocyclohexane or Gammexane, is an important industrial chemical. Its insecticidal potency, particularly of the gamma isomer, is well known. It has been known for a long period that benzene hexachloride could be produced by the complete addition chlorination of benzene. However, no fully satisfactory method has as yet been disclosed for this reaction.

An object of the present invention is to provide a new and improved reaction technique. An additional object is to overcome some of the specific deficiencies of the prior art. A further object is to provide an efficient continuous process and apparatus for carrying out the process. A still further object is to provide a higher degree of conversion of benzene to benzene hexachloride.

The principal reaction method of the prior art involves the batchwise photochemical chlorination of benzene in a reaction pot or vessel. The chlorination is continued until the quantity of benzene hexachloride produced is sufficient to exceed the solubility in benzene, and a large proportion of benzene hexachloride formed is present in the solid phase. Chlorination is then stopped and the mixture of unreacted benzene, dissolved benzene hexachloride, and solid benzene hexachloride removed from the reactor. The solids are separated by filtration, the liquid or filtrate being then combined with fresh benzene and returned to the chlorination step.

The above reaction method, although it has been commercially used, is far from being entirely satisfactory. A particular disadvantage of the method is the physical condition of product mixture resulting. A mixture of solids and liquids is of course more difficult to handle than a liquid system. In the manufacture of benzene hexachloride the disadvantage of a mixture of solids and liquids is even more pronounced. The crystals of benzene hexachloride tend to deposit in the equipment and to cause plugging of pumps, valves and lines. Thus, the reacted mixture is quite unsuitable for product separation and recovery. A further disadvantage of the prior art method is the frequent necessity of discarding large amounts of the reactor solution. This wasteful operation is necessitated because the recovery method is predicated upon the formation of a separate solid product in the reactor proper. The effect of this technique is to cause a build up in concentration of any impurities in the reactor solution. These impurities may be normally liquid or normally solid materials resulting from the chlorination of impurities in the feed benzene. As the reaction technique contemplates a benzene hexachloride recovery operation such as filtration or the like, these impurities are ordinarily removed from the system by the obviously wasteful procedure of discarding the solution at periodic intervals. Alternatively, the benzene may be distilled off and the impurities separated. This has the disadvantage of introducing another step in the overall process.

An additional fault of the batchwise chlorination method described is the irregular concentration of the various isomers of the product. This is caused by the fact that the different isomers of benzene hexachloride have varying solubilities in benzene. Hence, in chlorinating until solids are formed, those first precipitated in the reactor do not correspond in proportions to the overall analysis of the benzene hexachloride actually formed by the reaction. This requires careful reblending of the products in order to offer a material of uniform composition.

In brief, the prior method of making benzene hexachloride suffers the disadvantages of producing a reaction mixture which is difficult to handle and process further. In addition, the technique employed requires frequent discard of valuable materials, or else a separate recovery operation to isolate unreacted benzene after interruption of the reaction. The batchwise chlorination also necessitates reblending of the final solid produced to obtain a uniform product.

It is an object of our invention to avoid serious difficulties of the prior art. In addition, our reaction fully meets the other objective of providing a continuous and highly efficient method giving a high yield of benzene hexachloride.

These objectives are attained by controlling the proportions of chlorine and benzene present so that the existence or formation of benzene hexachloride in the solid phase is avoided. In addition, we irradiate the reaction mixture for a relatively extended period while confining the mixture as a stream of limited cross sectional area. These concurrent requirements are essential to the accomplishment of the objectives of our reaction method.

In order to avoid the formation of a solid phase in the reactor, the proportion of chlorine relative to benzene is restricted. We limit the proportion of chlorine fed so that, upon complete conversion to benzene hexachloride, the solubility thereof in benzene is not exceeded at any point in the apparatus. Thus, the conditions are maintained so that crystals are not precipitated at valves, constrictions, or other points in the reactor.

We have found several methods of determining the specific allowable flow rates or ratios of chlorine and benzene in our process. Although each of the procedures provide the same result, they differ in applicability and feasibility of use. Broadly speaking, the most direct method consists in determining the chlorine:benzene ratio at which solid benzene-hexachloride is first formed, and then reducing the chlorine rate a slight quantity below that value. In practice, this can be done by operating at a specific chlorine:benzene ratio until a steady state is reached, then raising the chlorine flow slightly. The reaction mixture is observed closely and the cycle is repeated until solids are formed. The chlorine:benzene ratio is then immediately reduced to prevent further formation of solid benzene hexachloride.

A preferred method of controlling the reaction employs density of the reaction solution as a control variable. It has been found that the density of the solution at the limiting condition, when corrected to 20° C. bears a linear relationship to the solution temperature. This limiting relationship is expressed as $$d = 0.8922 + 0.00237T$$

where $d$ = density at 20° C. in grams per cubic centimeter, and $T$ = the solution temperature, °C.

Figure 5:
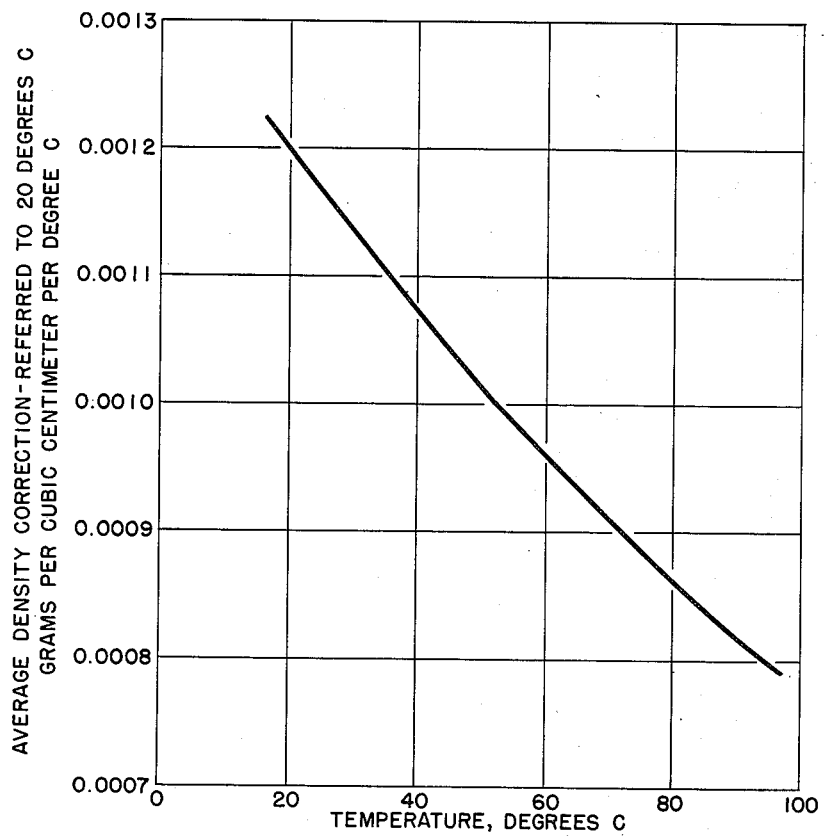

The density, $d$, the control variable, is determined conveniently by measurement of the actual solution density with a hydrometer at any convenient temperature. This observed density is then corrected to the density at 20° C. An integrated average density correction factor is shown by Figure 5. The actual density, for our preferred conditions, is from 0.85 to 1.03 grams per cubic centimeter.

It has been found that the limiting density, as expressed by the equation given above, does not correspond to the density of a saturated solution of benzene hexachloride. Rather, this limiting density is a finite amount below that corresponding to saturation. The reason for this difference is not fully understood, as it might be expected that it would be possible to chlorinate up to the saturation limit for the solution. One possible explanation might be the existence of a slow moving film of solution at the cooled walls of a reactor. Precipitation of benzene hexachloride crystals would probably occur because of the lower temperature at that point. By maintaining the solution density as specified above, such difficulty is avoided.

In order to operate below the defined density limitation, we employ a relatively low chlorine to benzene feed ratio. The density is controlled by varying this ratio. This is in contrast to prior methods, which taught that chlorination should be carried to as great an extent as possible. In actual operation, the determination of the density of the reaction mixture at only one point is usually adequate. Preferably, we measure the density of the reacted mixture leaving the reactor.

The entire reacting mixture is exposed to actinic light for an extended period. A reaction period of five minutes or more is ordinarily required in our operation, a preferred reaction period being about 15 minutes. In almost every case, a reaction period of 20 minutes is adequate for relatively complete conversion of chlorine to benzene hexachloride.

It will be noted that our method insures that every portion of the reacting mixture is irradiated for the full extended period described above. This assures uniform conversion of the chlorine in its passage through the reactor. In prior methods, stratification of the reaction mixture permits discharge of unreacted chlorine. Our method avoids this difficulty and assures that the chlorine is retained in the radiation zone for the full period required.

Additional requirements of our reaction method are the steps of maintaining the reaction mixture as a stream of limited cross sectional area and completely irradiating this stream with actinic light. By completely irradiating we refer to transmission of actinic light through the entire cross section of the stream. The use of a stream of relatively limited cross sectional area makes possible this complete irradiation. A further advantage of a limited cross sectional area is the avoidance of stratification, so that the reaction mixture is uniform at any given cross section. Our reaction stream may be maintained in rectangular, square, circular, or annular cross section. Other irregular cross sections are quite suitable. We have found that, with the preferred light sources, the cross section should ordinarily have a hydraulic radius not in excess of 1.5 inches. This figure is not, however, an absolute limitation, as even larger streams can be utilized when an especially intense actinic light source is available. A preferred size of reaction stream, particularly suited for use with currently available actinic light sources, is a stream with a hydraulic radius of 0.75 inch. Smaller streams are satisfactory, but as a practical matter, we have found it preferable not to go below a stream with a hydraulic radius of 0.5 inch.

Figure 4:
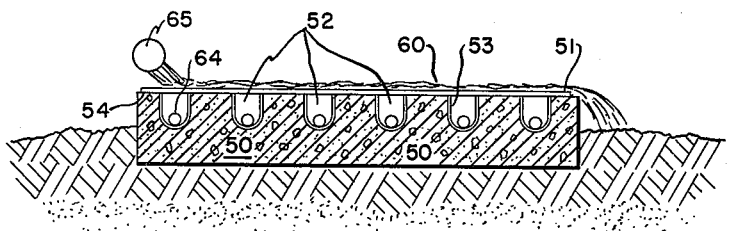

A variety of embodiments of our invention is possible, providing that the limitations heretofore stated are adhered to. The accompanying figures illustrate several embodiments and means of carrying out the invention. Figure 1 is an elevation view of a preferred embodiment utilizing a reactor conduit of high capacity. Figure 2 shows a transverse section of a reactor conduit along line 2—2 of Figure 1 as well as means of supplying actinic light to the reaction mixture. Figure 3 illustrates an embodiment carried out in a more economically constructed reactor. Figure 4 shows a transverse section of the reactor of Figure 3 along lines 4—4. In Figure 5, a density correction factor is graphically shown.

Referring to Figure 1, this embodiment employs a reactor comprising an extended cylindrical conduit transmissive of actinic light. Chlorine gas is fed to the unit through line 10, the flow being controlled by valve 11. A liquid stream predominating in benzene is fed through line 12, the rate of flow being controlled by valve 13. The chlorine and benzine containing stream mix in line 14, the chlorine dissolving in the benzene. The mixture then immediately flows to the reactor. The reactor is composed of a series of light transmissive tubes 15 connected by return bends 16.

The reaction mixture is subjected to the action of actinic light radiated by fluorescent lights 17.

In passing through the conduit, the chlorine is completely converted to benzene hexachloride by reaction with the benzene.

The reacted mixture, comprising benzene and benzene hexachloride is discharged from the reactor through line 18 and flows to suitable recovery operations. The temperature of the reaction mixtures can be measured by several temperature indicators 19. Samples are withdrawn for measurement of density through sample connections 20. Density of the solution is quite simply adjusted by increasing or decreasing the chlorine feed rate while keeping the benzene rate constant.

The reaction of benzene and chlorine liberates appreciable quantities of heat which must be dissipated in part from the liquid phase. Cooling water is fed to the unit through line 28 and valve 21, to a distributing trough 22. Trough 22 is merely a V trough in which water flows over the edges 23 and drips from a notched distributor plate 24 which is aligned above the reaction tube 15.

Figure 2 is a transverse sectional view 2—2 of the reaction conduit of Figure 1. In this embodiment the preferred light sources are tubular fluorescent lights 17 emitting white light varying from 4000 to 7000 Angstrom units. The preferred disposition of the lights is such that the cooling water 27 forms a continuous peripheral stream around the reaction conduit 15. The conduit 15 is filled or substantially filled with the reacting mixture in liquid phase 25 as indicated. A small amount of vapor 26 is formed, the quantity dependent on the temperature and possible substitution chlorination of impurities in the benzene, resulting in hydrogen chloride formation.

A second embodiment of our invention is shown by Figures 3 and 4. Figure 3 is a plan view of the reactor. The reactor of the present embodiment differs from the reactor of Figure 1 in that it is of unitary construction. The reactor is essentially a cast concrete slab 50 with a reaction channel 52 cast therein. Referring to Figure 4, a transverse section 4—4 of the reactor, the reaction conduit 52 is completed by a cover 51 of glass or other material transmissive of actinic light. The channels 52 in the concrete are preferably sealed with an impervious coating of carbon-phenolic resin cement or other impermeable material. The light transmissive cover 51 is preferably secured in place with a layer of impervious cement 54. The conduits 52 are preferably coated with a lining of impervious cement 53. Light sources are not shown by Figures 3 and 4. In this embodiment they are suspended above the light transmissive cover 51 by any convenient means.

The reaction in the present apparatus is carried out in much the same manner as in the reactor of Figure 1. Chlorine gas is fed through line 55 and valve 56 and admixed with a predominantly benzene solution fed through line 57 and valve 58. The mixture is fed to conduit 52 through line 59.

The reaction occurs as in the reactor of Figure 1, a certain amount of vaporization occurring. The present reactor is not as efficiently cooled as a reactor cooled around its entire periphery. However, as explained hereafter, temperature is not a critical factor in the reaction. Heat removal is accomplished by flow of cooling water 60 across the glass cover 51, the water being supplied by pipe 65. For operation at high capacity, a cooling tube 64 can be built into the conduit 52.

The reacted mixture is discharged from the conduit 52 through line 61, temperature being observed by indicator 62. Samples are removed by sample connection 63, for measurement of the density for control purposes.

The temperature at which we carry out the reaction is not critical although it is important. We have found that temperature has very little effect on reaction rate, which is contrary to published information (Slator, Journal of the Chemical Society 83, p. 729 et seq.). However, we have found that it is ordinarily preferable to maintain the solution temperature at not over 80° C. Operating at a temperature above 80° C. necessitates pressure operation to maintain the reacting mixture substantially in the liquid phase. With respect to low temperatures, we are able to operate successfully at temperatures approaching the freezing point of benzene. However, for practical operation, it is preferred to operate above 20° C., because of the much greater tendency to form solids at temperatures below 20° C.

It will be noted that the use of a reaction stream of restricted cross section, as utilized in our method, possesses the additional advantage that temperature is easily controlled.

The pressure of operation is not a limiting factor as the desired reaction occurs in the liquid phase. For practical convenience, we have found that an operating pressure slightly above atmospheric is preferred. Operating pressures which are much higher than 15 pounds per square inch should not ordinarily be used, as they introduce numerous practical engineering problems. The preferred range is 5 to 15 pounds per square inch, dependent on the pressure drop at the operating rate.

The benzene feed stream may be pure benzene or may contain appreciable amounts of dissolved benzene hexachloride. The permissible use of a recycled dilute solution of benzene hexachloride is especially useful in continuous operations. A basic requirement of our reaction method is that a relatively large proportion of benzene is fed. Hence, substantial amounts of benzene are recycled after removal of all or a part of the benzene hexachloride content of the outlet stream. The preferred composition of the benzene feed stream is less than 15 percent benzene hexachloride. It is ordinarily uneconomical and unnecessary for the benzene hexachloride content to be less than 2 percent benzene hexachloride.

The benzene hexachloride in the product solution from our reaction can be recovered in several ways known to the art. For example, steam distillation is a suitable method of separation. An especially advantageous method comprises vaporizing the benzene at relatively low temperature, and fusing the benzene hexachloride at a temperature of over 160° C.

The reaction can be maintained by various types of actinic light. Sunlight, ultraviolet light, or the irradiation from a carbon arc are suitable. The effectiveness of different types of light is attributed to the wide spread of spectral absorption by chlorine. Although various forms of actinic light thus can be used, we have found that a preferred light source is fluorescent tubular lights emitting white light. These light sources give forth light ranging between 4000 and 7000 Angstrom units. The preferred intensity of such light is that produced by wattage of from 10 to 20 per lineal foot of reaction conduit.

The following is a full scale operation of our reaction method. The reactor used in this example corresponds in general design to the design illustrated by Figure 1 and Figure 2, heretofore described. The reactor is fabricated of boro-silicate heat resistant glass and was uniformly 3 inches in inside diameter. The irradiated reaction section was 120 feet long.

The benzene feed, consisting of 12 pounds per hour of nitration grade benzene, is mixed with 1165 pounds of a recycle benzene stream containing 6.5 percent benzene hexachloride. Chlorine is mixed with this stream at the rate of 32 pounds per hour. The total feed to the reactor is then 1209 pounds per hour, containing 91 percent benzene, 6.3 percent benzene hexachloride and 2.7 percent chlorine. The residence time in the reactor is approximately 19 minutes. The reaction is initiated and maintained by light predominantly in the 4000 to 7000 Angstrom unit range. The chlorine feed is approximately 97 percent converted to benzene hexachloride, giving a reactor product mixture containing 9.8 percent benzene hexachloride.

The reaction temperature is 57° C. in the first section of the reactor and the discharge temperature is 40° C. At this discharge temperature, the limiting operating density, corrected to 20° C. is 0.987 gram per cubic centimeter. The actual density of the outlet stream, at 40° C., is 0.961 gram per cubic centimeter. The average density correction factor, from Figure 5, is 0.00107 gram per cubic centimeter per °C., giving a total correction of 0.021. The density of the reactor product mixture, corrected to 20° C., is thus 0.94, which is well below the limiting density of 0.987. No solids were formed at any point in the reactor and the reactor product was a solid-free, clear solution.

The foregoing is an example of operation at a very low rate. Much higher production rates can be attained in the same apparatus. For example, 73 pounds per hour of fresh benzene and 193 pounds of chlorine are mixed with 2000 pounds of a recycle benzene stream containing 13 percent benzene hexachloride. This mixture is fed to the same reactor as used in the foregoing example. At the present high feed rate, the reaction temperatures are substantially higher, varying from 80° to 50° C. The conversion of chlorine to benzene hexachloride is over 95 percent as in the preceeding example.

Having fully described our invention and the manner of operation, it will be apparent to one skilled in the art that numerous embodiments can be utilized in addition to those illustrated herein.

We claim:

A continuous process for reacting chlorine with benzene to produce benzene hexachloride containing the gamma isomer, comprising subjecting a moving stream of chlorine and benzene to the influence of actinic light at a temperature between 20° and 80° C. in a reaction zone having a restricted cross section with a hydraulic radius between 0.5 and 1.5 inches and under a pressure of at least about 5 pounds per square inch, controlling the ratio of chlorine to benzene in the stream to maintain the density of the resulting solution, measured at 20° C., in accordance with that given by the equation $$d = 0.8922 + 0.00237 T$$

wherein: $d$=density at 20° C. in grams per cubic centimeter, and $T$=solution temperature, °C.; to prevent a solid phase of benzene hexachloride from forming, and recovering benzene hexachloride from said stream.

LEO A. MILLER.
JAMES H. DUNN.
CLARENCE M. NEHER.

References Cited in the file of this patent

UNITED STATES PATENTS

| Number | Name | Date |
|---|---|---|
| 1,735,610 | Goodall et al. | Nov. 12, 1929 |
| 2,034,184 | Hartman | Mar. 17, 1936 |
| 2,438,900 | Cooke et al. | Apr. 6, 1948 |
| 2,459,049 | Sconce et al. | Jan. 11, 1949 |
| 2,499,120 | Stormon | Feb. 28, 1950 |
| 2,502,258 | Hay et al. | Mar. 28, 1950 |
| 2,529,803 | Gonze | Nov. 15, 1950 |
| 2,607,723 | Pianfetti et al. | Aug. 19, 1952 |

FOREIGN PATENTS

| Number | Country | Date |
|---|---|---|
| 573,689 | Great Britain | Dec. 3, 1945 |

OTHER REFERENCES

Neil et al., Canadian Chemistry and Process Industries, April 1948, pp. 335–338, 340.